United States Patent [19]

Sugasawa et al.

[11] Patent Number: 5,085,090
[45] Date of Patent: Feb. 4, 1992

[54] ROTATION TRANSMITTING MECHANISM

[75] Inventors: Isamu Sugasawa, Sagamihara; Hidenori Ito, Atsugi, both of Japan

[73] Assignee: Ricoh Company, Ltd., Tokyo, Japan

[21] Appl. No.: 469,386

[22] Filed: Jan. 24, 1990

[30] Foreign Application Priority Data

Jan. 27, 1989 [JP] Japan ................................... 1-18055
Apr. 24, 1989 [JP] Japan ................................ 1-105611

[51] Int. Cl.$^5$ ............................................ F16H 15/00
[52] U.S. Cl. ........................................ 74/202; 74/404; 74/810.1; 475/12
[58] Field of Search ................. 74/404, 202, 204, 206, 74/810.1, 810.2, 126, 352; 475/12, 13; 192/20, 21

[56] References Cited

U.S. PATENT DOCUMENTS

| | | | |
|---|---|---|---|
| 1,195,082 | 8/1916 | Player et al. | 74/202 |
| 1,710,631 | 4/1929 | Loram | 74/810.1 |
| 2,506,562 | 5/1950 | Wait | 74/810.1 X |
| 2,749,779 | 6/1956 | Godat | 74/810.1 |
| 2,765,679 | 10/1956 | Godat | 74/810.1 X |
| 4,382,683 | 5/1983 | Teagle | 74/404 X |

Primary Examiner—Leslie A. Braun
Assistant Examiner—Scott J. Anchell
Attorney, Agent, or Firm—Oblon, Spivak, McClelland, Maier & Neustadt

[57] ABSTRACT

A rotation transmitting mechanism includes a first cylindrical body, a second cylindrical body arranged parallel to the first cylindrical body, a rotary body disposed parallel to the first cylindrical body, and circumscribed with the first and second cylindrical body, a pressing unit for pressing one of the first and second cylindrical bodies against the other of the first and second cylindrical bodies so as to make the first and second cylindrical bodies contact each other, and a moving unit for moving the rotary body toward a point where the first cylindrical body contacts the second cylindrical body so as to inhibit contact of the first cylindrical body with the second cylindrical body, and to contact the rotary body with the first and second cylindrical bodies, and for retreating the rotary body in a direction opposite to the aforementioned point so as to permit contact of the first cylindrical body with the second cylindrical body, which contact is caused by the pressing unit. The rotation transmitting mechanism can smoothly transmit rotation because transmission of rotation is performed by frictional force.

12 Claims, 7 Drawing Sheets

ROTATION TRANSMITTING MECHANISM

BACKGROUND OF THE INVENTION

1. Field of the Invention

This invention relates to a rotation transmitting mechanism in which a shaft rotates in the fixed direction irrespective of the direction of rotation of another shaft.

2. Description of the Related Art

A kind of apparatus in which an output shaft is driven in the fixed direction irrespective of the direction of rotation of an input shaft is known as, for example, feed tables for machine tools. Ordinarily, in this apparatus, a rotation transmitting mechanism for reverse rotation is interposed between the feed table and a main shaft, and the direction of the rotation transmitted to the feed table is changed over by the rotation transmitting mechanism if the direction of rotation of the main shaft is changed by following a driving unit separately provided.

Conventionally, mechanisms based on the combination of gears are generally used as this kind of rotation transmitting mechanism. For example, a drive gear is provided on an input shaft of a rotation transmitting mechanism to mesh with a driven gear fixed to an output shaft. As the input shaft connected to a driving source such as a motor is rotated counterclockwise, the output shaft is rotated clockwise and opposite to the rotation of the input shaft through the drive gear and the driven gear. The drive gear is axially slidable on the input shaft by the function of, for example, a slide key, and meshes with an intermediate gear provided on an intermediate shaft when axially moved. The intermediate gear meshes with another driven gear disposed on the output shaft parallel to the former driven gear. The rotation of the input shaft is transmitted to the output shaft through the drive gear, the intermediate gear and the latter driven gear, thereby rotating the output shaft counterclockwise in the same direction as the input shaft. That is, it is possible for the rotation transmitting mechanism to change over the direction of rotation of the output shaft by artificially sliding the drive gear on the input shaft. Accordingly, even if the rotation of the motor provided as the drive source is reversed according to the direction of rotation of the other connected drive unit, the output shaft can be rotated in the same direction as previous by changing over the drive gear.

In this type of conventional rotation transmitting mechanism, however, there is a need for the operation of changing over the drive gear according to the direction of rotation of the drive source as well as a need for providing the changeover mechanism having a complicate structure. This rotation transmitting mechanism therefore entails the problem of the operation being complicated and inconvenient as well as the problem of increase in the production cost. Moreover, because the rotation is transmitted through gear, it cannot be smoothly transmitted owing to backlashes between the gears when the rotation is reversed.

SUMMARY OF THE INVENTION

The present invention has been achieved in consideration of these problems of the conventional art, and a first object of the present invention is to provide a rotation transmitting mechanism in which there are provided input and output shafts having transmission surfaces brought into contact with each other by a first pressing force, and there are further provided a transmission roller contacting the input and output shafts by a second pressing force, so that the rotation of the input shaft is directly transmitted to the output shaft when the input shaft is rotated in the normal direction, the rotation is transmitted through the transmission roller when the input shaft is rotated in the reverse direction, thereby enabling the output shaft to rotate always in the fixed direction without using any complicate changeover mechanism or artificial changeover operation and enabling the rotation to be smoothly transmitted while limiting the manufacture cost.

A second object of the present invention is to provide a rotation transmitting mechanism in which there are provided an input shaft and a plurality of driven shafts, which input shaft and driven shafts have transmission surfaces on which the input shaft is brought into contact with each of the driven shafts by a first pressing force, and there are further provided transmission rollers which is of the same number as the driven shafts and each contact the input shaft and the driven shaft by a second pressing force, so that the rotation of the input shaft is directly transmitted to the driven shafts when the input shaft is rotated in the normal direction, the rotation is transmitted through the transmission rollers when the input shaft is rotated in the reverse direction, the output shaft is rotated through the driven shafts, thereby enabling the output shaft to rotate always in the fixed direction without using any complicate changeover mechanism or artificial changeover operation and enabling the rotation to be smoothly transmitted while limiting the manufacture cost. In accordance with this construction, the input and output shafts are coaxially disposed and the change in the distance between the input shaft and each driven shaft and side force, which change and side force are caused when the transmission rollers are inserted, are radially distributed and absorbed. Therefore the distance between the input and output shafts is constantly maintained, thereby eliminating restrictions in terms of use and improving the rotation transmission efficiency as well as the reliability of the mechanism.

The first object is achieved by the its first to third inventions, and the second object is achieved by the fourth invention.

The first invention relates to a rotation transmitting mechanism comprising: a first cylindrical body rotatably disposed around a first axis; a second cylindrical body rotatably disposed around axis parallel to the first axis; a rotary body rotatably disposed around a third axis parallel to the first axis, disposed in such a manner as to contact at an outer circumferential surface thereof outer circumferential surfaces of the first cylindrical body and the second cylindrical body, and disposed movably along a direction of crossing perpendicularly a plane including the first axis and the second axis; pressing unit for pressing one of the first and second cylindrical bodies against the other of the first and second cylindrical bodies to make the first and second cylindrical bodies contact with each other; and moving unit for moving said rotary body in the perpendicularly crossing direction so as to make the rotary body contact the first and second cylindrical bodies while inhibiting contact between said first and second cylindrical bodies, and for making the rotary body retreat along the perpendicularly crossing direction to allow the first and second cylindrical bodies to be brought into contact with each other by the pressing unit.

The second invention relates to a rotation transmitting mechanism comprising: a flat plate body translationally disposed in a predetermined direction; a cylindrical body rotatably disposed around a first axis extending perpendicular to the predetermined direction and in parallel to one of two surfaces of the flat plate body; a rotary body rotatably disposed around a second axis parallel to the first axis, disposed in such a manner that outer circumferential surface thereof is circumscribed with the one of the two surfaces of the flat plate body and an outer circumferential surface of the cylindrical body, and disposed movably in the predetermined direction; pressing unit for pressing one of the flat plate body and the cylindrical body against the other of the flat plate body and the cylindrical body to make the flat plate body and the cylindrical body contact with each other; and a moving unit for moving forward the rotary body in the predetermined direction so as to make the rotary body contact the flat plate body and the cylindrical body while inhibiting contact between the flat plate body and the cylindrical body, and for making the rotary body retreat in the predetermined direction to allow the flat plate body and the cylindrical body to be brought into contact with each other by the pressing means.

The third invention relates to a rotation transmitting mechanism comprising: a hollow cylindrical body rotatably disposed around a first axis; a solid cylindrical body rotatably disposed around a second axis parallel to the first axis, and inscribed at an outer circumferential surface thereof with an inner circumferential surface of the hollow cylindrical body; a rotary body rotatably disposed around a third axis parallel to the first axis, and disposed in such a manner that an outer circumferential surface thereof is inscribed with the inner circumferential surface of the hollow cylindrical body and is circumscribed with an outer circumferential surface of the solid cylindrical body, and disposed movably along the outer circumferential surface of the solid cylindrical body and the inner circumferential surface of the hollow cylindrical body; pressing unit for pressing one of the solid and hollow cylindrical bodies against the other of the solid and hollow cylindrical bodies to make the hollow and solid cylindrical bodies contact with each other; and moving unit for moving the rotary body along the outer circumferential surface of the solid cylindrical body and the inner circumferential surface of the hollow cylindrical body so as to make the rotary body contact the hollow and solid cylindrical bodies while inhibiting contact between the hollow and solid cylindrical bodies, and for making the rotary body retreat along the outer circumferential surface of the solid cylindrical body and the inner circumferential surface of the hollow cylindrical body to allow the hollow and solid cylindrical bodies to be brought into contact with each other by the pressing unit.

The fourth invention relates to a rotation transmitting mechanism comprising: a first solid cylindrical body rotatably disposed around a first axis; a hollow cylindrical body rotatably disposed coaxially with the first axis in such a manner as to surround the first solid cylindrical body, and made of an elastically deformable material; a second solid cylindrical body rotatably disposed around a second axis parallel to the first axis and located between the first solid cylindrical body and the hollow cylindrical body, and arranged in such a manner that an outer circumferential surface of the second solid cylindrical body is inscribed with an inner circumferential surface of the hollow cylindrical body and circumscribed with an outer circumferential surface of the first solid cylindrical body; a third solid cylindrical body rotatably disposed around a third axis parallel to the first axis and located between the first solid cylindrical body and the hollow cylindrical body so as to form equal-angular distance with respect to the second axis, and arranged in such a manner that an outer circumferential surface of the third solid cylindrical body is inscribed with the inner circumferential surface of the hollow cylindrical body and circumscribed with the outer circumferential surface of the first solid cylindrical body; a first stationary retainer disposed in one of two spaces defined between the inner circumferential surface of the hollow cylindrical body and the outer circumferential surfaces of the first to third solid cylindrical bodies, the first stationary retainer being formed in such a manner that a first surface thereof facing the inner circumferential surface of the hollow cylindrical body slidably contacts the inner circumferential surface of the hollow cylindrical body, a second surface thereof facing the outer circumferential surface of the first solid cylindrical body slidably contacts the outer circumferential surface of the first solid cylindrical body, and a third surface thereof facing the second solid cylindrical body and a fourth surface thereof facing the third solid cylindrical body have respectively shapes complementary with the outer circumferential surfaces of the second and third solid cylindrical bodies so as to permit the second and third solid cylindrical bodies to radially move; a second stationary retainer disposed in the other of the two spaces, the second stationary retainer being formed in such a manner that a fifth surface thereof facing the inner circumferential surface of the hollow cylindrical body slidably contacts the inner circumferential surface of the hollow cylindrical body, sixth surface thereof facing the outer circumferential surface of the first solid cylindrical body slidably contacts the outer circumferential surface of the first solid cylindrical body, and a seventh surface thereof facing the second solid cylindrical body and a eighth surface thereof facing the third solid cylindrical body have respectively shapes complementary with the outer circumferential surfaces of the second and third solid cylindrical bodies so as to permit the second and third solid cylindrical bodies to radially move; a fourth solid cylindrical body rotatably disposed around a fourth axis parallel to the first axis, and arranged so as to be circumscribed with the first and second solid cylindrical bodies; a fifth solid cylindrical body rotatably disposed around a fifth axis parallel to the first axis, and arranged so as to be circumscribed with the first and third cylindrical bodies; a first moving unit for moving the fourth solid cylindrical body toward a first point where the first solid cylindrical body contacts the second solid cylindrical body so as to inhibit contact of the first solid cylindrical body with the second solid cylindrical body, and for retreating the fourth solid cylindrical body in a direction opposite to the first point so as to permit contact of the first solid cylindrical body with the second solid cylindrical body, which contact is caused by resilient force of the hollow cylindrical body; and a second moving unit for moving the fifth solid cylindrical body toward a second point where the first solid cylindrical body contacts the third solid cylindrical body so as to inhibit contact of the first solid cylindrical body with the third solid cylindrical body and to contact the fifth solid cylindrical body with the first and third solid cylindrical bodies, and for retreating the fifth solid cylindrical body in a direction opposite to the second point so as to permit contact of the first solid cylindrical body with the third solid cylindrical body, which contact is caused by a resilient force of the hollow cylindrical body.

In accordance with the first to third inventions, input and output shafts brought into contact with each other by the pressing force of a first pressing means is provided along with a rotation transmitting member which contacts the input and output shafts by the pressing force of a second pressing unit. The rotation of the input shaft is directly transmitted to the output shaft when the input shaft is rotated clockwise, or is transmitted through the rotation transmitting member when the input shaft is rotated counterclockwise, thereby enabling the output shaft to be rotated always in the fixed direction without using any complicated changeover mechanism or artificial changeover operation. The structure of the rotation transmitting mechanism can therefore be simplified, thereby reducing the manufacture cost. Since the rotation is transmitted by frictional force through the input shaft, the rotation transmitting member and the output shaft, there is therefore no unevenness of transmission owing to backlashes of rotation transmitting gears, and the rotation can be transmitted always smoothly through the rotation transmitting mechanism.

In accordance with the fourth invention, an output shaft and a plurality of driven shafts each of which is brought into contact with the output shaft by the pressing force based on the resiliency of an output shaft are provided along with the number of torque transmitting rollers corresponding to the number of driven shafts, the torque transmitting rollers contacting the input shaft and the plurality of driven shafts by the pressing force of a pressing unit. The rotation of the input shaft is directly transmitted to the driven shafts when the input shaft is rotated clockwise, or is transmitted to the driven shafts through the rotation transmitting rollers when the input shaft is rotated counterclockwise, and the output shaft is rotated through the driven shafts, thereby enabling the output shaft to be rotated always in the fixed direction irrespective of the direction of rotation of the input shaft. The same effects as those attained in the first to third invention can therefore be obtained. Moreover, in the fourth invention, the input and output shafts are disposed coaxially and the change in the distance between the input shaft and each driven shaft and side force caused when the transmission rollers are inserted into gaps between the input shaft and the driven rollers are radially distributed and absorbed, so that the distance between the input and output shafts is constantly maintained, thereby eliminating restrictions of in terms of use owing to variations in this distance and improving the rotation transmission efficiency as well as the reliability of the mechanism.

Further objects and advantages of the present inventions will be apparent from the following description of the preferred embodiments of the inventions as illustrated in the accompanying drawings.

DESCRIPTION OF THE PREFERRED EMBODIMENTS

Figure 1:
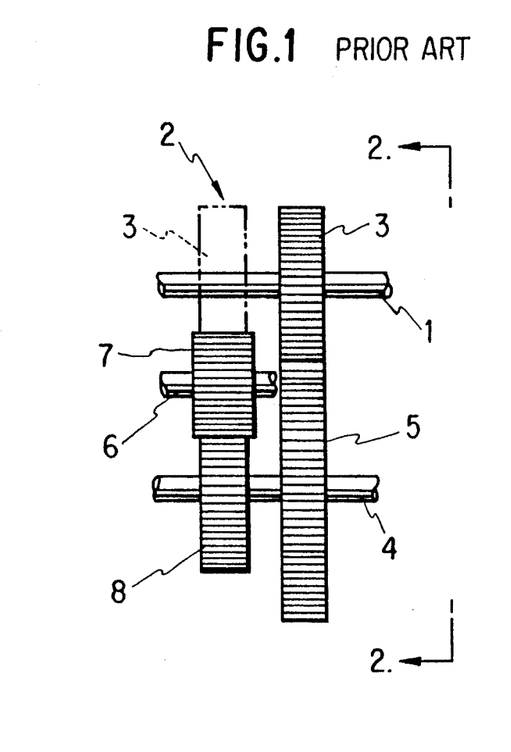
FIG. 1 is a front view showing the construction of a conventional rotation transmitting mechanism.
Figure 2:
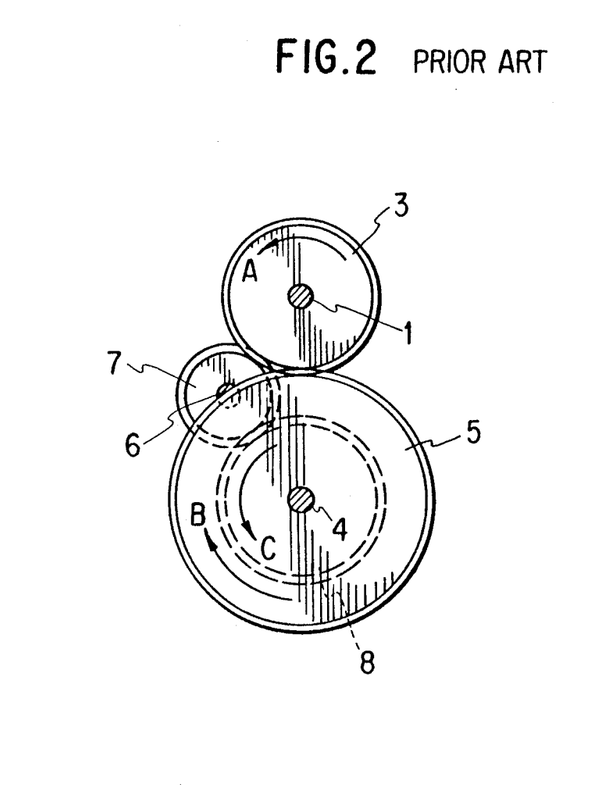
FIG. 2 is a perspective diagram taken in the direction of the arrows 2 of FIG. 1.

For ease of understanding of the present invention, the related art will be described below with reference to the arrangement shown in FIGS. 1 and 2 before the description of the present invention.

A kind of device driven in the fixed direction irrespective of the direction of rotation of a main shaft is known as, for example, a feed table for machine tools. Ordinarily, a rotation transmitting mechanism for reverse rotation is interposed between the feed table and a main shaft, and the direction of the rotation transmitted to the feed table is changed over by the rotation transmitting mechanism if the direction of rotation of the main shaft is changed by following a driving unit separately provided.

Conventionally, mechanisms based on the combination of gears are generally used as this kind of rotation transmitting mechanism. For example, a type of mechanism shown in FIGS. 1 and 2 is known. Referring to FIG. 1, a drive gear 3 is provided on an input shaft 1 of a rotation transmitting mechanism 2 to mesh with a first driven gear 5 fixed to an output shaft 4. As the input shaft 1 connected to an unillustrated driving source such as a motor is rotated counterclockwise as indicated by the arrow A, the output shaft 4 is rotated clockwise as indicated by the arrow B, i.e., opposite to the rotation of the input shaft 1 through the drive gear 3 and the driven gear 5. The drive gear 3 is axially slidable on the input shaft 1 by the function of, for example, a slide key provided therebetween, and meshes with an intermediate gear 7 provided on an intermediate shaft 6 when moved to a position indicated by the double-dot-dash line on the left-hand side of FIG. 1. The intermediate gear 7 meshes with a second driven gear 8 disposed on the output shaft 4 parallel to the driven gear 5. The rotation of the input shaft 1 is transmitted to the output shaft 4 through the drive gear 3, the intermediate gear 7 and the driven gear 8, thereby rotating the output shaft 4 counterclockwise in the same direction as the input shaft 1, as indicated by the arrow C in FIG. 2. That is, it is possible for the rotation transmitting mechanism 2 to change over the direction of rotation of the output shaft 4 by artificially sliding the drive gear 3 on the input shaft 1. Accordingly, even if the rotation of the motor provided as the driven source is reversed according to the direction of rotation of the other connected driven unit, the output shaft 4 can be rotated in the same direction as previous by changing over the drive gear 3.

Embodiments of the present invention will be described below with reference to the accompanying drawings.

Figure 3:
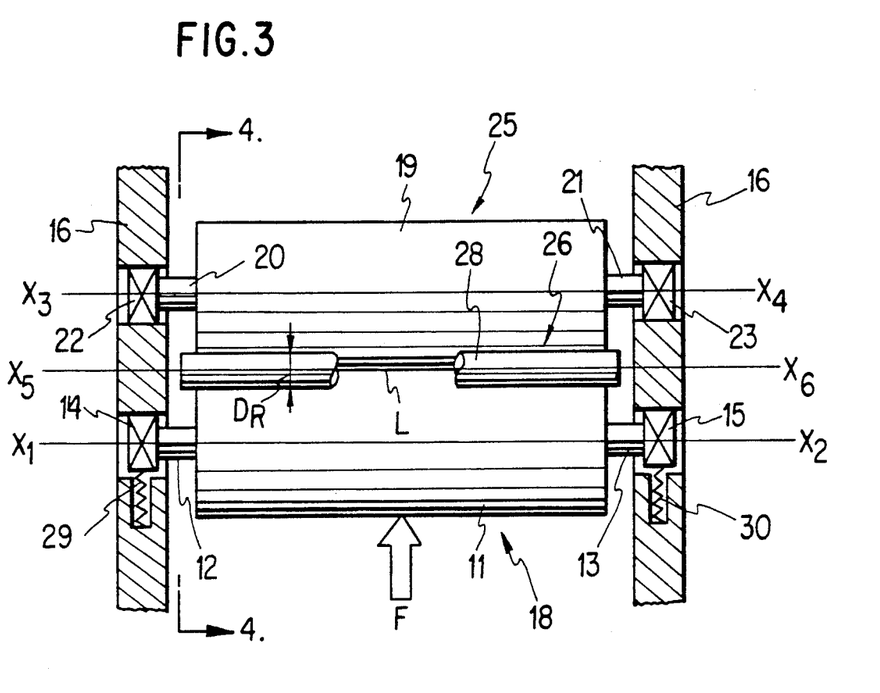
FIG. 3 is a partially sectional view showing the construction of a rotation transmitting mechanism according to a first embodiment of the first invention.
Figure 4:
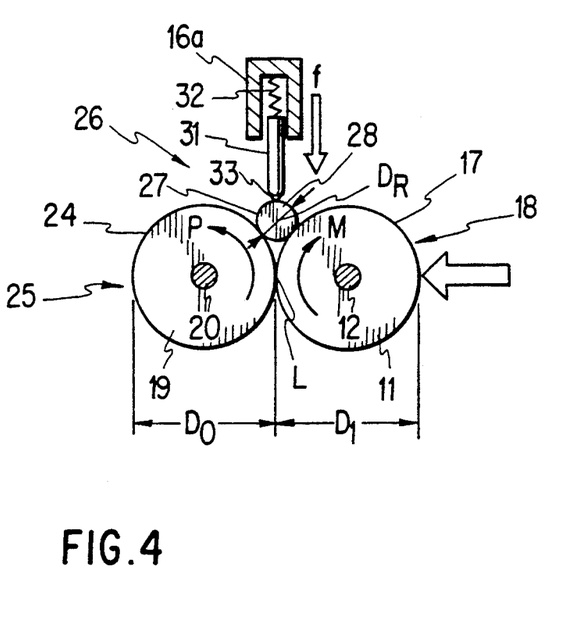
FIGS. 4 and 5 are partially sectional views taken in the direction of the arrows 4 of FIG. 3, showing the operation of the mechanism according to the first embodiment.
Figure 5:
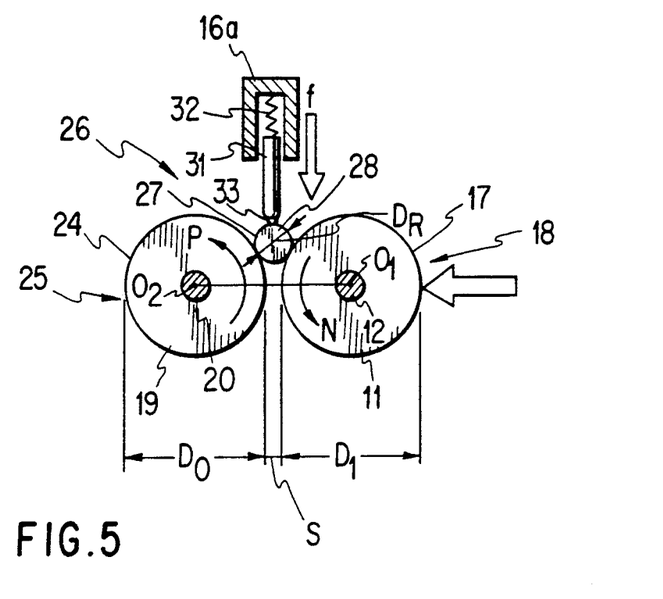

FIGS. 3 to 5 show a rotation transmitting mechanism which represents a first embodiment of the first invention. The construction of this rotation transmitting mechanism is as described below.

Referring to FIG. 3, a cylindrical body 11 is supported on a frame 16 by shaft necks 12 and 13 projecting from its opposite end portions and bearings 14 and 15 so as to be rotatable on an axis $X_1$-$X_2$. The cylindrical body 11 has a transmission surface 17 having a circular cross-sectional shape, as shown in FIG. 4, and constitutes and input shaft 18. Another cylindrical body 19 is disposed parallel to the cylindrical body 11 and is supported on the frame 16 by shaft necks 20 and 21 and bearings 22 and 23 constructed in the same manner as those for the cylindrical body 11. The cylindrical body 19 is rotatable on an axis $X_3$-$X_4$ parallel to the axis $X_1$-$X_2$. As in the case of the cylindrical body 11, the cylindrical body 19 has a transmission surface 24 having a circular cross-sectional shape as shown in FIG. 4 and constitutes an output shaft 25. Referring to FIGS. 3 and 4, a transmission roller 26 is disposed so as to be rotatable on an axis $X_5$-$X_6$ parallel to the axis $X_1$-$X_2$ and the axis $X_3$-$X_4$. The transmission roller 26 is constituted by a cylindrical body 28 having an outer circumferential surface 27 having a certain outer diameter $D_R$. Referring again to FIG. 3, a pair of first springs 29 and 30 are interposed between the bearings 14 and 15 and the frame 16. The input shaft 18 is pressed against the output shaft 25 by a first pressing force F applied to the input shaft 18 by the springs 29 and 30, so that the transmission surface 17 of the input shaft 18 and the transmission surface 24 of the output shaft 25 contact each to her on a contact line L. Further, as shown in FIG. 4, a pair of second springs 32 are interposed between a sub-frame 16a disposed at an upper portion of the frame 16 and a base end of metallic retaining member 31 having an extreme end slidably contacting the outer circumferential surface 27 of the transmission roller 26. The outer circumferential surface 27 of the roller 26 is brought into contact with the transmission surfaces 17 and 24 of the input and output shafts 18 and 25 by a second pressing force f applied to the roller 26 downward as viewed in FIG. 4 by the springs 32. The positional relationship between the input shaft 18 and the output shaft 25 is adjusted in such a manner that when the input shaft 18 and the output shaft 25 are moved apart from each other against the pressing force F of the springs 29 and 30 as shown in FIG. 5, the movements of the bearings 29 and 30 as shown in FIG. 5, the movements of the bearings 14 and 15 are limited by unillustrated guides provided in the frame 16 so that the range of the distance S between the transmission surfaces 17 and 24 is very small in comparison with the predetermined outer diameter $D_R$ of the roller 26. That is, such a relationship as defined by an equation (1) shown below is established between the outer diameter $D_R$ of the roller 26 and the limited distance S between the transmission surfaces 17 and 18. Accordingly, if the outer diameters of the cylindrical bodies 11 and 19 constituting the input and output shafts 18 and 25 are $D_i$ and $D_o$, respectively, and if the distance between the center axes of the input and output shafts 18 and 25 when the same are spaced apart from each other is $\overline{O_1\text{-}O_2}$, a relationship defined by an equation (2) shown below is established. The pressing force F, of course, acts in such directions as to always reduce the distance S.

$$S << D_R \qquad (1)$$

$$\tfrac{1}{2}(D_i + D_o) \leq \overline{O_1\text{-}O_2}$$

$$<< \tfrac{1}{2}(D_i + D_o) + D_R \qquad (2)$$

The pressing force f by which the springs 32 press the roller 26 is smaller than the pressing force F of the springs 29 and 30 so that when the input shaft 18 and the output shaft 25 are not rotated, the transmission roller 26 is maintained in a state where the transmission roller 26 is retreated upward by the input and output shafts 18 and 25, as shown in FIG. 4, and that in this state the outer circumferential surface 27 lightly contacts the transmission surfaces 17 and 24 of the input and output shafts 18 and 25. In this embodiment, both the pressing forces F and f are produced by the resiliency of the springs, but means for producing the pressing forces F and f may be any other pressing or urging means which uses a different type of resilient member or a means for applying magnetic forces in a case where the cylindrical bodies 11 and 19 constituting the input and output shafts 18 and 25 and the cylindrical body 28 constituting the transmission roller 26 are formed of a steel material. The outer diameter $D_R$ of the transmission roller 26 is not larger than 1/10 of each of the outer diameters $D_i$ and $D_o$ of the input and output shafts 18 and 25. It is not always necessary to apply the pressing force F from the side of the input shaft 18 alone; the pressing force F may be applied from the side of the output shaft 25 or from the two sides of the input and output shafts 18 and 25. Balls 33 having a small diameter are rotatably attached to the extreme end of the metallic retaining member 31 to be brought into contact with the roller 26, thereby enabling the transmission roller 26 to rotate smoothly. Each of the cylindrical bodies 11, 19, and 28 is formed of a material having a large stiffness and a large surface friction coefficient; it may be formed of one material selected from metallic materials including the above-mentioned steel material, ceramics, plastics, and the like or may be formed of a mixture or combination of these materials selected to utilize the characteristics of each material.

In this embodiment, the arrangement may alternatively be such that the output shaft 25 constituted by the cylindrical body 11 is rotatable in each of the normal and reverse directions while the input shaft 18 constituted by the cylindrical body 19 is rotated in the fixed direction.

Next, the operation of this embodiment will be described below. It is assumed here that rotation of the input shaft 18 with which the point on the input shaft 18 indicated by the contact line L approaches the transmission roller 26 as shown in FIG. 4, i.e., clockwise rotation indicated by the arrow M in FIG. 4 is normal rotation, and that rotation of the input shaft with which the point of the input shaft 18 indicated by the contact line L moves away from the transmission roller 26 as shown in FIG. 5, i.e., counterclockwise rotation indicated by the arrow N in FIG. 5 is reverse rotation.

In a case where the input shaft 18 is rotated in the normal direction as shown in FIG. 4 to transmit the torque to the output shaft 25, the transmission roller 26 in contact with the transmission surface 17 of the input shaft 18 is forced upward against the pressing force f with the rotation of the input shaft 18 because the pressing force f of the springs 32 is small. Simultaneously, the input shaft 18 is pressed against the output shaft 25 by the pressing force F, and transmission surfaces 17 and 24 contact each other, and the rotation of the input shaft 18 is transmitted to the output shaft 25 by the effect of the friction between the transmission surfaces 17 and 18. The output shaft 25 thereby rotates opposite to the rotation of the input shaft 18, as indicated by the arrow P in FIG. 4. In a case where the input shaft 18 is rotated in the reverse direction as shown in FIG. 5 to transmit the rotation to the output shaft 25, the transmission roller 26 is rolled in between the input and output shafts 18 and 25 by the force of friction with the input shaft 18 and by the pressing force f as the input shaft 18 rotates, thereby being inserted in the gap between the transmission surfaces 17 and 24 of the input and output shafts 18 and 25. Simultaneously, the input and output shafts 18 and 25 are spaced apart from each other against the pressing force F. At this time, the distance between the transmission surfaces 17 and 24 is limited by the guides of the bearings 14 and 15, and its maximum value is S expressed by the equation (1). The contact between the input and output shafts 18 and 25 is shut off, and the rotation of the input shaft 18 is transmitted to the output shaft 25 through the transmission roller 26. The reverse rotation of the input shaft 18 indicated by the arrow N is therefore reversed by the roller 26, and the output shaft 25 rotates in the direction indicated by the arrow P, i.e., in same direction as in the case of the normal rotation of the input shaft 18. At this time, as expressed by the equation (1), S is extremely small in comparison with $D_R$, and there is therefore no possibility of the transmission roller 26 being further wrapped in and moving beyond the line $O_1-O_2$ connecting the centers of the input and output shafts 18 and 25 to come off from these shafts. The output shaft 25 to which the torque of the input shaft 1 is transmitted can be rotated in the fixed direction as indicated by the arrow P in FIGS. 4 and 5 irrespective of the normal/reverse rotation of the input shaft 18, as described above.

In this embodiment, as described above, the input and output shafts 18 and 25 having the transmission surfaces 17 and 18 capable of contacting each other by the pressing force F and the roller 26 contacting the input and output shafts 18 and 25 by the pressing force f are disposed, and the input shaft 18 is brought into contact with the output shaft 25 to directly transmit the torque of the input shaft 18 to the output shaft 25 when the input shaft 18 is rotated in the normal direction, or the torque of the input shaft 18 is transmitted to the output shaft 25 through the transmission roller 26 while being reversed when the input shaft 18 is rotated in the reverse direction. Thus, it is possible to constantly maintain the direction in which the output shaft 25 rotates without artificially changing over a complicate changeover mechanism such as that required by the related art. The transmission mechanism is therefore simplified in structure and reduced in production cost. Moreover, because the rotation is transmitted by the friction between the input shaft 18, the output shaft 25 and the transmission roller 26, the problem of unevenness of rotation owing to backlashes of rotation transmitting gears can be eliminated and the rotation can be transmitted always smoothly.

As mentioned above, it is preferable to set the outer diameter $D_R$ of the roller 26 to 1/10 or less of the outer diameters $D_i$ and $D_o$ of the input and output shafts 18 and 25. If $D_R$ is larger than this value, the roller 26 is not suitably rolled in when the input shaft 18 is rotated in the reverse direction. It is also preferable to limit the force f of pressing the roller 26 to a magnitude enough to prevent the roller 26 from moving apart from the input and output shafts 18 and 25. If the pressing force f is excessively large, the force F of pressing the input shaft 18 against the output shaft 25 is apparently reduced and the frictional force produced between the transmission surfaces 17 and 24 of the input and output shafts 18 and 25 during normal rotation of the input shaft 18 becomes insufficient, resulting in failure to transmit the rotation. The pressing force must be large enough to produce sufficient frictional force between the transmission surfaces 17 and 24 of the input and output shafts 18 and 25 during normal rotation of the input shaft 18. If this force makes it difficult to move apart the input and output shafts 18 and 25, the outer diameter $D_R$ may be reduced to facilitate wrapping-in of the transmission roller 26 or the friction coefficients of the transmission surfaces 17 and 24 of the input and output shafts 18 and 25 and the outer circumferential surface 27 of the transmission roller 26 may be increased.

If in this embodiment the output shaft 25 constituted by the cylindrical body 19 is rotatable in the normal and reverse directions while the input shaft 18 constituted by the cylindrical body 11 is rotated in the fixed direction, an output of normal/reverse rotation can be obtained from an input rotating in the fixed direction.

Figure 6:
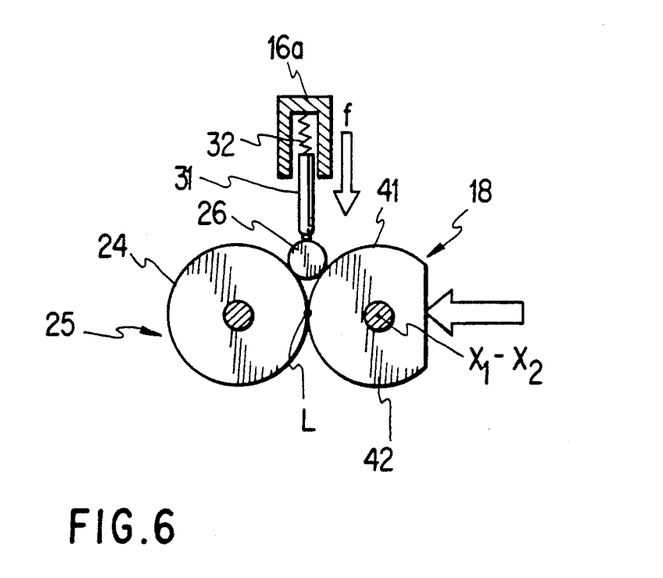
FIG. 6 is a partially sectional view taken in the same direction as FIG. 4, showing a rotation transmitting mechanism which represents a second embodiment of the first invention.

FIG. 6 shows a rotation transmitting mechanism which represents a second embodiment of the first invention. In this embodiment, as shown in FIG. 6, the input shaft 18 is rotatable on the axis $X_1-X_2$, and is constituted by a cut cylindrical body 42 having a transmission surface 41 defined on its radial peripheral portion and having a cross-sectional shape of a partially cut circle. The transmission surface of the input shaft 18 is brought into contact with the transmission surface 24 of the output shaft 25 on the contact line L. Except for this portion, the construction and functions of this embodiment are similar to those of the first embodiment, and this embodiment therefore has the same effects as the first embodiment. In this embodiment, the construction of the cut cylindrical body 42 is not limited to the input shaft 18, and the same construction may be alternatively applied to the output shaft 25 alone or to both the input and output shafts 18 and 25.

In the second embodiment, the cylindrical body 24 may constitute the input shaft rotating in the fixed direction while the cut cylindrical body 42 constitutes the output shaft rotatable in the normal and reverse directions. An output of normal or reverse rotation is thereby obtained from an input rotating in the fixed direction.

Figure 7:
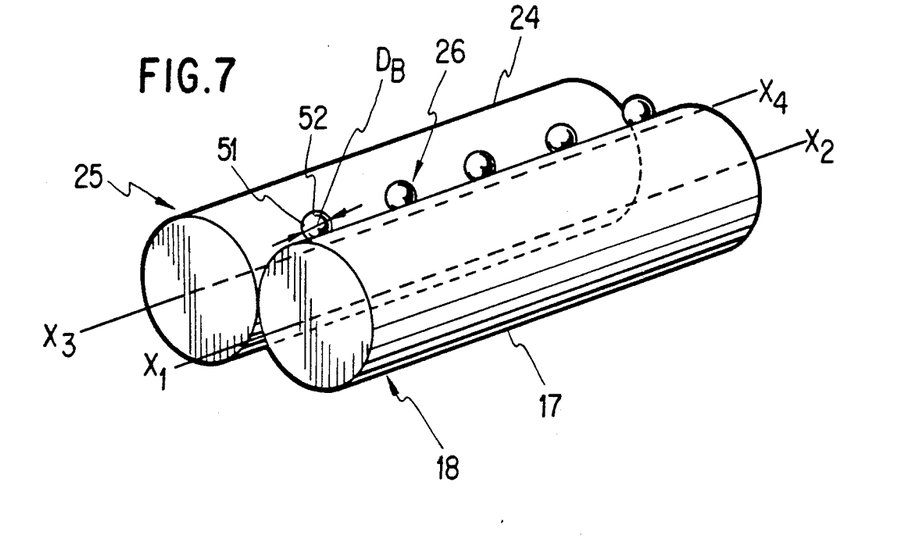
FIG. 7 is a perspective view of the transmission roller of a rotation transmitting mechanism which represents a third embodiment of the first invention.

FIG. 7 shows a rotation transmitting mechanism which represents a third embodiment of the first invention. In this embodiment, as shown in FIG. 7, the transmission roller 26 is constituted by a plurality of balls 52 with outer peripheral surfaces 51 having an outer diameter $D_B$. The balls 52 are respectively supported by a metallic retaining member 31 such as that shown in FIG. 4. The balls 52 are rotatable about their respective centers while receiving the second pressing force f from the second springs 32 and contacting at the outer peripheral surfaces 51 the transmission surfaces 17 and 24 of the input and output shafts 18 and 25. The outer diameter of each ball 52 is equal to the outer diameter $D_R$ of the cylindrical body 28 constituting the transmission roller 26 of the first embodiment and therefore satisfies the conditions expressed by the equations (1) and (2). Except for the balls, the construction and functions of this embodiment are similar to those of the first embodiment, and this embodiment therefore has the same effects as the first embodiment. Needless to say, the roller 26 of this embodiment can be used in the second embodiment.

Figure 8:
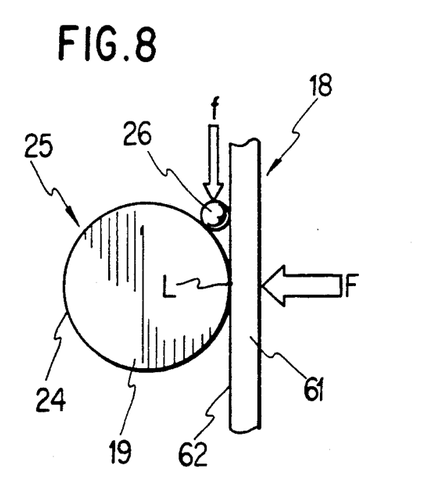
FIGS. 8 and 9 are schematic diagrams taken in the same direction as FIG. 4, showing rotation transmitting mechanisms which represent respectively an embodiment and another embodiment of the second invention.

Next, rotation transmitting mechanisms according to the second invention will be described below. FIG. 8 shows a rotation transmitting mechanism which represents an embodiment of the second invention. FIG. 8 is a schematic diagram taken in the same direction as in FIG. 4 showing the first embodiment of the first invention. In this embodiment, as shown in FIG. 8, the input shaft 18 is constituted by a flat plate 61, while the output shaft 25 is constituted by the cylindrical body 19 as in the first embodiment provided in the first invention. The flat plate 61 has a flat transmission surface 62 which contacts the transmission surface 24 on the contact line L. When the input shaft 18 is moved in a normal direction so that the flat plate 61 moves along the transmission surface 62 and that the point on the flat plate 61 indicated by the contact line L approaches the transmission roller 26, the transmission roller 26 is forced upward against the pressing force f and the transmission surface 62 and the transmission surface 24 are brought into contact with each other by the pressing force F, thereby enabling the movement of the input shaft 18 in the normal direction to be transmitted as rotation to the output shaft 25. When the input shaft 18 is moved in a reverse direction such that the point on the flat plate 61 indicated by the contact line L moves away from the transmission roller 26, the roller 26 is inserted into the gap between the transmission surface 62 and the transmission surface 24 while the input shaft 18 and the output shaft 25 are spaced apart from each other, and the movement of the input shaft 18 is transmitted to the output shaft 25 through the roller 26, thereby rotating the output shaft 25 in the same direction as in the case of the normal movement of the input shaft 18. Thus, the output shaft 25 is rotated always in the fixed direction irrespective of the movement of the input shaft in the normal or reverse direction. Except for these points, the construction and functions of this embodiment are similar to those of the first embodiment provided in the first invention, and this embodiment therefore has the same effects.

In this embodiment, the arrangement may alternatively be such that the output shaft 25 constituted by the cylindrical body 19 is rotatable in the normal and reverse directions while the input shaft 18 constituted by the flat plate 61 is moved in the fixed direction. An output of normal/reverse rotation is thereby obtained from an input moving in the fixed direction.

Figure 9:
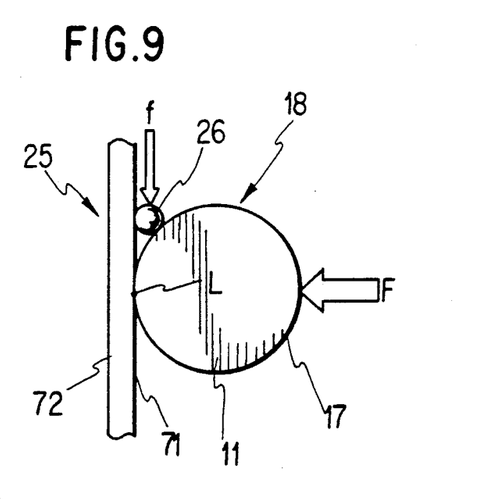

FIG. 9 shows a rotation transmitting mechanism which represents another embodiment of the second invention. FIG. 9 is a schematic diagram similar to FIG. 8. In this embodiment, as shown in FIG. 9, the input shaft 18 is constituted by the cylindrical body 11 as in the first embodiment of the first invention, while the output shaft 25 is constituted by a flat plate 72 having a flat transmission surface 71. The output shaft 25 is moved always in the fixed direction irrespective of the direction of rotation of the input shaft 18 in the same manner as the embodiment mentioned above. Except for these points, the construction and functions of this embodiment are similar to those of the first embodiment provided in the first invention, and this embodiment therefore has the same effects. The embodiment shown in FIG. 8 exemplifies a case where the input shaft 18 is constituted by a flat plate which corresponds to one of the two components, i.e., the cylindrical body and the flat plate provided in the second invention while the output shaft 25 is constituted by a cylindrical body which corresponds to the other of these two components. The embodiment shown in FIG. 9 exemplifies a case where the input shaft 18 is constituted by a cylindrical body which corresponds to one of the two components while the output shaft 25 is constituted by a flat plate which corresponds to the other of the two components. Needles to say, this embodiment can be applied to the arrangement in which the roller 26 is constituted by a plurality of balls 52 as in the third embodiment provided in the first invention.

In this embodiment, the arrangement may alternatively be such that the output shaft 25 constituted by the flat plate 72 is movable in opposite directions while the input shaft 18 constituted by the cylindrical body 11 is rotated in the fixed direction. Reciprocative output movements in the opposite directions are thereby obtained from an input rotating in the fixed direction.

Figure 10:
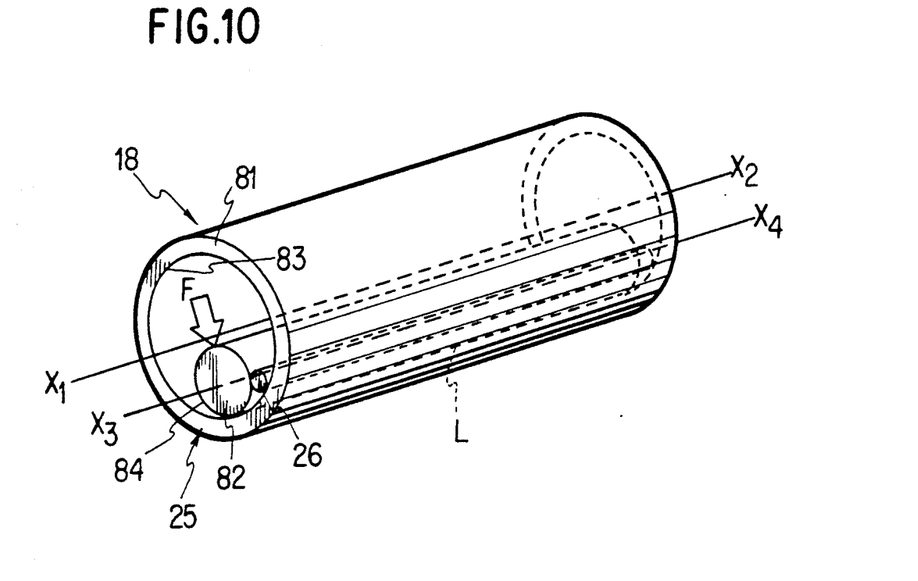
FIGS. 10 and 11 are schematic perspective views of rotation transmitting mechanisms which represent respectively an embodiment and another embodiment of the third invention.

FIG. 10 is a schematic perspective view of a rotation transmitting mechanism which represents an embodiment of the third invention. In this embodiment, as shown in FIG. 10, the input shaft 18 is constituted by a hollow cylindrical body 81 rotatable on the axis $X_1$–$X_2$, while the output shaft 25 is constituted by a solid cylindrical body 82 rotatable on the axis $X_3$–$X_4$. The hollow cylindrical body 81 has a transmission surface 83 formed on its inner radial periphery, and the solid cylindrical body 82 has a transmission surface 84 formed on its outer radial periphery. The solid cylindrical body 82 constituting the output shaft 25 is inserted in the hollow cylindrical body 81 constituting the input shaft 18, and the transmission surfaces 83 and 84 are brought into contact with each other on the contact line L by the first pressing force F. Except for these points the construction and functions of this embodiment are the same as the first embodiment of the first invention, and this embodiment also has the same effects.

In this embodiment, the arrangement may alternatively be such that the output shaft 25 constituted by the solid cylindrical body 82 is rotatable in the normal and reverse directions while the input shaft 18 constituted by the hollow cylindrical body 81 is rotated in the fixed direction. An output of normal/reverse rotation is thereby obtained from an input rotating in the fixed direction.

Figure 11:
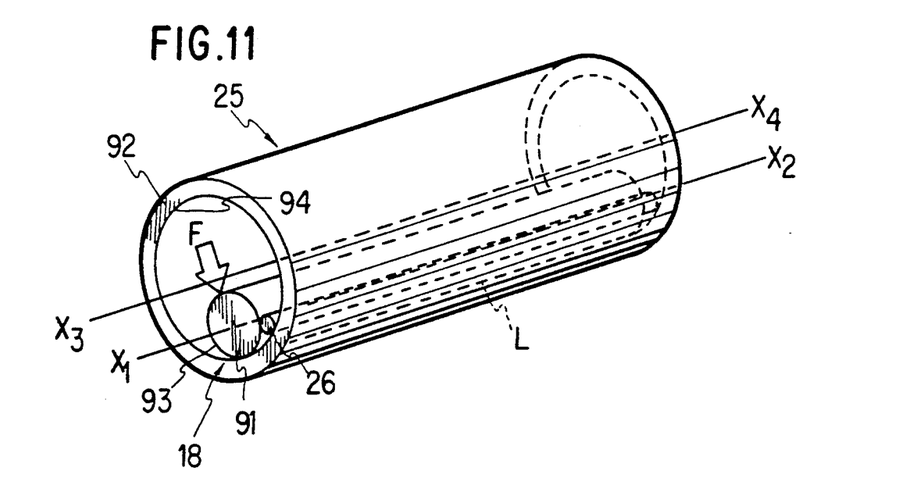

FIG. 11 is a schematic perspective view of a rotation transmitting mechanism which represents another embodiment of the third invention. In this embodiment, as shown in FIG. 11, the input shaft 18 is constituted by a solid cylindrical body 91 rotatable on the axis $X_1$–$X_2$, while the output shaft 25 is constituted by a hollow cylindrical body 92 rotatable on the axis $X_3$–$X_4$. The solid cylindrical body 91 has a transmission surface 93 formed on its outer radial periphery, and the hollow cylindrical body 92 has a transmission surface 94 formed on its inner radial periphery. The solid cylindrical body 91 constituting the input shaft 18 is inserted in the hollow cylindrical body 92 constituting the output shaft 25, and the transmission surfaces 93 and 94 are brought into contact with each other on the contact line L by the first pressing force F. Except for these points the construction and functions of this embodiment are the same as the first embodiment provided in the first invention, and this embodiment, of course, has the same effects.

The embodiment shown in FIG. 10 exemplifies a case where the input shaft 18 is constituted by a hollow cylindrical body which corresponds to one of the two components, i.e., the solid cylindrical body and the hollow cylindrical body provided in the third invention while the output shaft 25 is constituted by a solid cylindrical body which corresponds to the other of these two components. The embodiment shown in FIG. 11 exemplifies a case where the input shaft 18 is constituted by a solid cylindrical body which corresponds to one of the two components while the output shaft 25 is constituted by a hollow cylindrical body which corresponds to the other of the two components. This embodiment can be applied to the arrangement in which the roller 26 is constituted by a plurality of balls 52 as in the case of the third embodiment in the first invention.

In this embodiment, the arrangement may alternatively be such that the output shaft 25 constituted by the hollow cylindrical body 92 is rotatable in the normal and reverse directions while the input shaft 18 constituted by the solid cylindrical body 91 is rotated in the fixed direction. An output of normal/reverse rotation is thereby obtained from an input rotating in the fixed direction.

Figure 12:
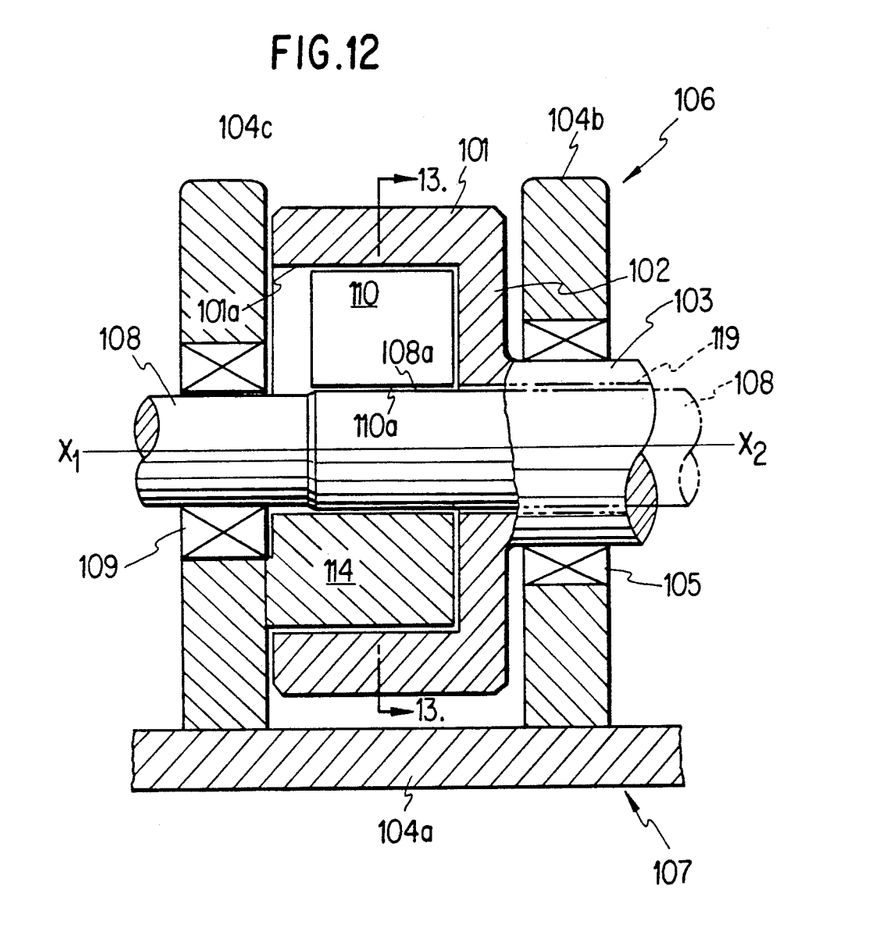
FIG. 12 is a front sectional view showing the construction of a rotation transmitting mechanism according to an embodiment of the fourth invention.
Figure 13:
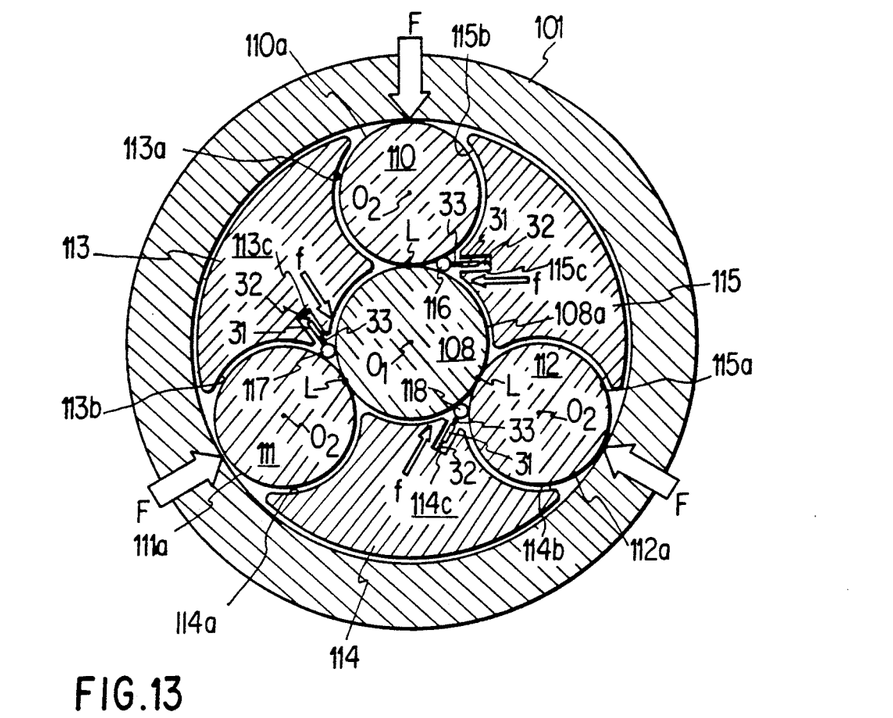
FIG. 13 is a sectional view taken in the direction of the arrows 13 of FIG. 12.
Figure 14:
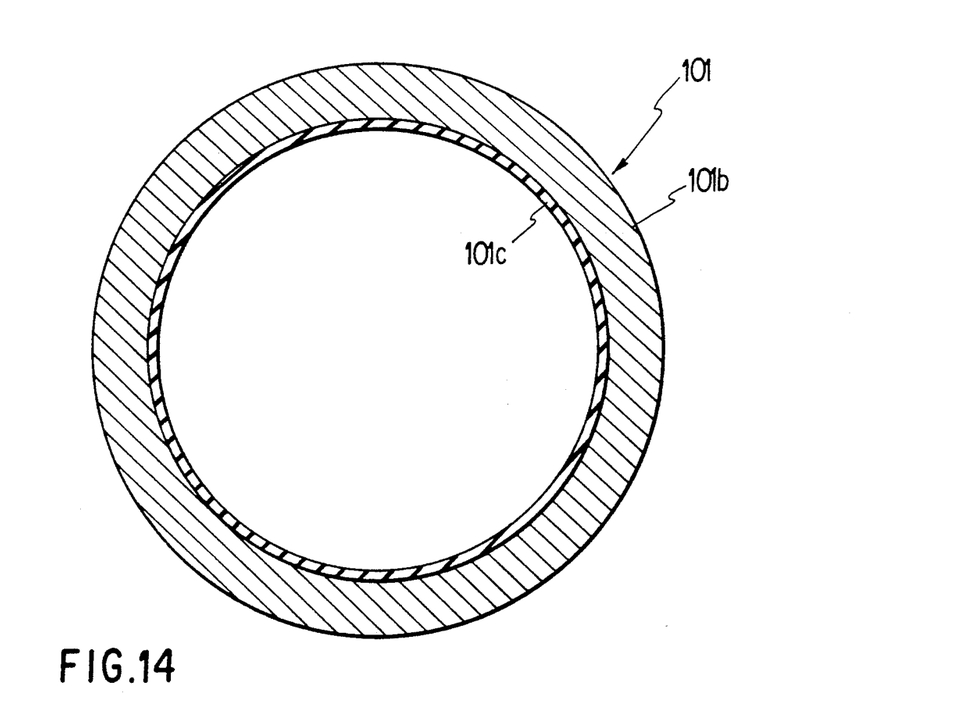
FIG. 14 is a sectional view corresponding to FIG. 13, showing another embodiment of the output shaft.

FIGS. 12 to 14 show a rotation transmitting mechanism which represents an embodiment of the fourth invention.

In the rotation transmitting mechanisms provided in the first to third inventions, the distance between the axes of the input and output shafts is slightly changed when the direction of rotation of the input shaft is changed over. The present fourth invention further aims to constantly maintain the distance between the axes of the input and output shafts for the purpose of eliminating restrictions of use, and also to cancel side force applied to the bearings when the input and output shafts are spaced apart from each other.

Referring to FIG. 12, a hollow cylindrical output shaft 101 has a cylindrical transmission surface on its inner radial periphery and is integrally connected to a support shaft 103 through a flange 102 at its right end as viewed in FIG. 12. The output shaft 101 is coaxial with the support shaft 103. The support shaft 103 connected to the output shaft 101 is axially supported by a bearing 105 on one of a pair of side frames 104b and 104c provided on a base 104a, i.e., on the side frame 104b on the right hand side as viewed in FIG. 12. The output shaft 101 is rotatable on an axis $X_1$-$X_2$. The base 104a and the side frames 104b and 104c constitute a frame 107 of the rotation transmitting mechanism 106 in accordance with this embodiment. A cylindrical input shaft 108 is disposed coaxially with the output shaft 101 and is rotatable on the axis $X_1$-$X_2$. The input shaft 108 is axially supported on the other of the pair of side frames 104b and 104c on the frame 107, i.e., the side frame 104c through a bearing 109 at its left end as viewed in FIG. 12. The other end of the input shaft 108 is inserted in the output shaft 101 so as to face the inner circumferential surface of the output shaft 101. The input shaft 108 has a cylindrical transmission surface 108a formed on its outer radial periphery so as to face the transmission surface 101a of the output shaft 101. As shown in FIG. 13, in accordance with this embodiment, a plurality of, i.e., three cylindrical driven shafts 110, 111, and 112 are disposed between the output shaft 101 and the input shaft 108. The driven shafts 110, 111, and 112 have cylindrical transmission surfaces 110a, 111a, and 112a on their outer radial peripheries, and these transmission surfaces are in contact with the transmission surface 101a of the output shaft 101. Stationary retainers 113, 114, and 115 are disposed between the output shaft 101 and the input shaft 108 so as to be successively interposed between two of the driven shafts 110, 111, and 112, and are fixed to the side frame 104c on the frame 107. The number of these retainers is equal to the number of the driven shafts 110, 111, and 112. The stationary retainers 113, 114, and 115 have circular-arc concave slide surfaces 113a, 113b, 114a, 114b, 115a, and 115b which are slidable on the transmission surfaces 110a, 111a, and 112a of the driven shafts 110, 111, and 112. The driven shafts 110, 11, and 112 are equally spaced apart from each other in the circumferential direction of the transmission surface 101a of the output shaft by the stationary retainers 113, 114, and 115, and are supported by the slide surfaces 113a, 113b, 114a, 114b, 115a, and 115b so as to be rotatable on axes parallel to the axis $X_1$-$X_2$. The diameter of the circle defined by the circular-arc sectional shape of each of the slide surfaces 113a, 113b, 114a, 114b, 115a and 115b of the slide stationary retainers 113, 114, and 115 is slightly larger than the diameter of each of the driven shafts 110, 11, and 112, thereby enabling the driven shafts 110, 111, and 112 to slightly move in the radial direction. Gaps are formed between the transmission surface 101a of the output shaft 101 and the outer peripheral surfaces of the stationary retainers 113, 114, and 115 extending along the transmission surface 101a, thereby rendering the output shaft 101 easily rotatable.

As shown in FIG. 13, transmission rollers 116, 117, and 118 are disposed between the input shaft 108 and each of the driven shafts 110, 111, and 112. The number of the transmission rollers 116, 117, and 118 is equal to the number of the driven shafts 110, 111, and 112, and the construction relating to each transmission roller is similar to that of the transmission roller 26 shown in FIG. 4 and described in connection with the first embodiment provided in the first invention or to that of the transmission roller 26 shown in FIG. 7 and described in connection with the third embodiment. The construction of members for applying the second pressing force F to each of the transmission rollers 116, 117, and 118 is similar to that of the metal retaining member 31, the second springs 32 and the balls 33 which are shown in FIG. 4. The corresponding members of this embodiment shown in FIG. 13 are indicated by the same reference characters and the description for the functions of the corresponding members will not be repeated. Each of recesses 113c, 114c, and 115c formed in the stationary retainers 113, 114, and 115 has the same function as the sub-frame 16a shown in FIG. 4.

In the thus-constructed rotation transmitting mechanism 106, the transmission surfaces 110a, 111a, and 112a of the driven shafts 110, 111, and 112 are respectively in contact with the transmission surface 101a of the output shaft 101 as mentioned above, and are brought into contact with the transmission surface 108a of the input shaft 108 by the first pressing force F applied in the radial direction by the resiliency of the output shaft 101 which resiliency acts in the circumferential direction. The driven shafts 110, 111, and 112 contact the input shaft 108 on contact lines L formed on the transmission surface 108a. When the input shaft 18 if rotated in the normal direction, i.e., in the clockwise direction so that points on the input shaft 108 indicated by the contact lines L respectively approach the transmission rollers 116, 117, and 118, or when the input shaft 18 is rotated in a reverse direction, i.e., in the counterclockwise direction so that points on the input shaft 108 indicated by the contact lines L respectively move away from the transmission rollers 116, 117, and 118, the input shaft 108, the driven shafts 110, 111, and 112 and the transmission rollers 116, 117, and 118 operate in the same manner as the input and output shafts 18 and 25 and the transmission roller 26 shown in FIGS. 4 and 5 and described with respect to the first embodiment provided in the first invention. The driven shafts 110, 111, and 112 therefore rotate in the fixed direction, i.e., in a counterclockwise direction as viewed in FIG. 13 irrespective of the normal/reverse rotation of the input shaft 108, as in the case of the output shaft 25 mentioned previously. The output shaft 101 thereby rotates in the fixed direction with the rotation of the driven shafts 110, 111, and 112 whose transmission surfaces 110a, 111a, and 112a are in contact with the transmission surface 101a. Thus, the output shaft 101 can be rotated in the fixed direction irrespective of the direction of rotation of the input shaft 108. When the driven shafts 110, 111, and 112 are spaced apart from the input shaft 108 against the pressing force F produced by the elastic deformation of the output shaft 101, the distance S between each of the transmission surface 110a, 111a, and 112a and the input shaft 108 is extremely small in comparison with the outer diameter $D_R$ of the transmission rollers 116, 117, and 118, as in the case of the first embodiment provided in the first invention. Needless to say, if the diameter of the input shaft 108 is $D_i$, the diameter of each of the driven shafts 110, 111, and 112 is $D_o$, and the distance between the center axes of the input shaft 108 and each of the driven shafts 110, 111, and 112 when the same are spaced apart from each other is $\overline{O_1-O_2}$, the equations (1) and (2) are satisfied.

In this embodiment, the input shaft 108 and the output shaft 101 are coaxially disposed on the axis $X_1-X_2$, and the distance between the input shaft 108 and each of the driven shafts 110, 111 and 112 is changed in a radial direction of the input shaft 108 and the output shaft 101 when the transmission rollers 116, 117, and 118 are inserted into the gaps between the input shaft 108 and each of the driven shafts 110, 111, and 112 while the input shaft 108 is rotated counterclockwise. At this time, the output shaft 101 deforms in the circumferential direction of the output shaft 101 alone, the distance between the output shaft 101 and the input shaft 108 is therefore constantly maintained. It is therefore possible to eliminate restrictions which may be imposed on the use of the rotation which may be imposed on the use of the rotation transmitting mechanism 106 if this distance is changed. Moreover, side forces produced when the input shaft 108 and the driven shafts 110, 111, and 112 are spaced apart from each other, i.e., the reaction forces against the first pressing force F are distributed radially and balanced with each other. No side force is therefore applied to the bearing 105 or 109, the rotation can be smoothly transmitted at an improved efficiency, and errors in the rotations of the input and output shafts can be eliminated, thus improving the reliability of the rotation transmitting mechanism.

FIG. 14 shows another embodiment of the output shaft 101 which is arranged to avoid the reduction in its durability caused by the fact that when the input shaft 108 is rotated counterclockwise as viewed in FIG. 13, i.e., in the reverse direction, the transmission rollers 116, 117, and 118 are inserted into the gaps between the input shaft 108 and each of the driven shafts 110, 111, and 112, the output shaft 101 deformed by the pressing force of the driven shafts 110, 111, and 112 so as to have a cross-sectional shape of a rounded triangle. That is, as shown in FIG. 14, the output shaft 101 has a double layer structure consisting of a rigid layer 101b formed as an outer cylindrical layer 101c having a smaller thickness and fitted to the inner circumferential surface of the rigid layer 101b. The rigid layer 101b is formed of a material having a large rigidity, e.g., a metal, a ceramic or a hard plastic, and the elastic layer 101c is formed of a material having high elasticity, e.g., a rubber, an elastic plastic or leather. The elastic layer 101c absorbs the above-mentioned radial movements of the driven shafts 110, 111, and 112 by deforming itself to prevent deformation of the rigid layer 101b. Needless to say, the extent of deformation of the elastic layer 101c is set so as to satisfy the equations (1) and (2). Also, the efficiency of the rotation transmission can be improved because the driven shafts 110, 111, and 112 contact the output shaft 101 through the elastic layer 101c.

In this embodiment, the input shaft 108 having the transmission surface 108a, and the three driven shafts 110, 111, and 112 having the transmission surfaces 110a, 111a, and 112a having the transmission surfaces 110a, 111a, and 112a brought into contact with the transmission surface 108a by the first pressing force F based on the resiliency of the output shaft 101 are provided along with the transmission rollers 116, 117, and 118 contacting the input shaft 108 and each of the driven shafts 110, 111, and 112 by the second pressing force F. When the input shaft 108 is rotated in the normal direction, the rotation is directly transmitted to the driven shafts 110, 111, and 112. When the input shaft 108 is rotated in the reverse direction, the rotation is transmitted to the driven rollers 110, 111, and 112 through the transmission rollers 116, 117, and 118. The output shaft 101 is rotated through the driven shafts 110, 111, and 112, and it therefore rotates always in the fixed direction irrespective of the direction of rotation of the input shaft 108. Thus, this embodiment has the same effects as the embodiments provided in the first to third inventions. Further, the input shaft 108 and the output shaft 101 are disposed coaxially with each other, and the side forces and the change in the distance between the input shaft 108 and each of the driven shafts 110, 111, and 112 produced when the transmission rollers 116, 117, and 118 are respectively inserted into the gaps between the input shaft 108 and each of the driven shafts 110, 111, and 112 are therefore distributed in radial directions and absorbed. The distance between the input shaft 108 and the output shaft 101 is thereby constantly maintained, thereby eliminating restrictions of the use of the rotation transmitting mechanism 106 and improving the rotation efficiency and the reliability of the rotation transmitting mechanism 106.

In this embodiment, the three driven shafts and the corresponding three transmission rollers are provided. However, the number of driven shafts or transmission rollers is not limited to this and may alternatively be two or four or more. It is also possible to replace the output shaft 101 and the input shaft 108 with each other, that is, the output shaft 101 may be used as an input shaft while the input shaft 108 is used as an output shaft. To change the fixed direction of rotation of output shaft 101, the positions of the transmission rollers 116, 117, and 118 may be shifted symmetrically with respect to the lines connecting the center $O_1$ of the input shaft 108 and the centers $O_2$ of the driven shafts 110, 111, and 112. In this embodiment, as shown in FIG. 12, the support shaft 103 of the output shaft 101 and the input shaft 108 are placed in opposite positions with respect to the flange 102 of the output shaft 101. However, the input shaft 108 and the output shafts 101 may be disposed coaxially to extend the same direction such a manner that the input shaft 108 is loosely fitted in a through hole 119 penetrating the flange 102 and the support shaft 103 along the axis $X_1$-$X_2$, as indicated by the double-dot-dash line in FIG. 12.

In this embodiment, the arrangement may alternatively such that the output shaft 101 is rotatable in the normal and reverse directions while the cylindrical input shaft 108 is rotated in the fixed direction, thereby obtaining an output of normal/reverse rotation from an input rotating in the fixed direction.

Many widely different embodiments of the present inventions may be constructed without departing from the spirit and scope of the present inventions. It should be understood that the present inventions are not limited to the specific embodiments described in the specification, except as defined in the appended claims.

What is claimed is:

1. A power transmitting mechanism comprising:
   a movable power input member to which power is inputted;
   a movable power output member juxtaposed to said power input member for receiving power from said power input member and for outputting received power, at least one member of said power input member and said power output member being cylindrical, said power input member and said power output member being relatively movable between a contact position, at which said power input member and said power output member contact one another at a contact portion therebetween, and a release position at which said power input member and said power output member are being released from a contact therebetween;
   an intermediate transmission member having a shape of one of a cylinder and a sphere, and movable disposed on said power input member and said power output member so as to contact both said power input member and said power output member, said intermediate transmission member having an outer diameter which permits insertion of said intermediated transmission member between said power input member and said power output member, when said power input member moves in a first direction, so that said power input member and said power output member separate and said intermediate transmission member contacts both said power input member and said power output member at said release position thereof, said outer diameter being not larger than 1/10 of an outer diameter of said at least one member of said power input member and said power output member;
   a first urging means for exerting a force on said intermediate transmission member, which force is set such that said intermediate transmission member is pushed back against said force, when said power input member moves in an opposite direction, which is opposite to said first direction, so that said power input and output members take said contact position, said force being directed toward said contact portion, so that said intermediate transmission member is inserted between said power input and output members when said input power member moves in said first direction; and
   a second urging means for urging one of said power input member and said power output member toward the other of said power input member and said power output member, for producing, at said release position, a first friction force between said power input member and said intermediate transmission member and a second friction force between said intermediate transmission member and said power output member when said power input member moves in said first direction, and for producing a third friction force between said power input member and said power output member, at said contact position, when said power input member moves in said opposite direction, said first friction force enabling transmission of movement of said power input member to said intermediate transmission member, said second friction force enabling transmission of a rotation of said intermediate transmission member to said power output member, said third friction force enabling transmission of a movement of said power input member to said power output member.

2. A power transmitting mechanism according to claim 1, wherein said power input member comprises a first cylindrical body rotatably disposed around a first longitudinal axis thereof, said power output member comprises a second cylindrical body rotatably disposed around a second longitudinal axis thereof parallel to said first longitudinal axis, and said intermediate transmission member is rotatably disposed around a third axis thereof.

3. A power transmitting mechanism according to claim 2, wherein said first cylindrical body is rotatable in each of a normal direction and a reverse direction reverse to the normal direction, and said second cylindrical body is rotated in a fixed direction.

4. A power transmitting mechanism according to claim 2, wherein said first cylindrical body is a partial cylinder which is cut along a plane parallel to said first longitudinal axis in such a manner that a cut surface of said partial cylinder is opposite to said second cylindrical body with respect to a contact portion between said first cylindrical body and said second cylindrical body.

5. A power transmitting mechanism according to claim 2, wherein said intermediate transmission member comprises a plurality of balls, and each of said balls is provided with said first urging means.

6. A power transmitting mechanism according to claim 2, wherein said second urging means includes a pair of springs interposed respectively between bearings disposed at opposite ends of said first longitudinal axis and a frame on which said bearings are supported.

7. A power transmitting mechanism according to claim 2, wherein said first urging means includes: a sub-frame extending substantially toward said contact portion, and having an opening formed in a portion thereof facing said intermediate transmission member; a spring housed in said sub-frame, and fixed at one end thereof to an inner surface of a top portion of said sub-frame in such a manner that the other end thereof can be displaced; and a retaining member contacted at one end thereof to said other end of said spring, and arranged in such a manner that the other end of said retaining member projects out of said sub-frame through said opening and slidably contacts an outer circumferential surface of said intermediate transmission member.

8. A power transmitting mechanism according to claim 2, wherein said first cylindrical body is rotatable in each of a normal direction and a reverse direction reverse to the normal direction, and said second cylindrical body is rotated in a fixed direction.

9. A power transmitting mechanism according to claim 2, wherein said first and second cylindrical bodies and said intermediate transmission member are made of steel, and said first and second urging means are so adapted to produce urging forces respectively by utilizing magnetic force.

10. A rotation transmitting mechanism according to claim 2, wherein each of said first cylindrical body, said second cylindrical body and said intermediate transmission member is formed of a ceramic material having a large rigidity and a large friction coefficient.

11. A power transmitting mechanism according to claim 2, wherein said second urging means comprises a maintaining means for maintaining said intermediate transmission member in a state where said intermediate transmission member is pressed between said first cylindrical body and said second cylindrical body.

12. A power transmitting mechanism according to claim 11, wherein said maintaining means is adapted to limit a spacing distance between said first cylindrical body and second cylindrical body in such a manner that said spacing distance is smaller than said outer diameter of said intermediate transmission member.

* * * * *